US011824860B2

(12) United States Patent
Jawed

(10) Patent No.: US 11,824,860 B2
(45) Date of Patent: Nov. 21, 2023

(54) SESSION-CENTRIC ACCESS CONTROL FOR SECURE EPHEMERAL SHELLS

(71) Applicant: eBay Inc., San Jose, CA (US)

(72) Inventor: John Ezra-Razi Jawed, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 196 days.

(21) Appl. No.: 17/349,630

(22) Filed: Jun. 16, 2021

(65) Prior Publication Data

US 2022/0407856 A1 Dec. 22, 2022

(51) Int. Cl.
H04L 9/40 (2022.01)
H04L 9/32 (2006.01)
G06F 21/45 (2013.01)

(52) U.S. Cl.
CPC .............. *H04L 63/10* (2013.01); *G06F 21/45* (2013.01); *H04L 9/321* (2013.01); *H04L 9/3263* (2013.01); *H04L 63/0823* (2013.01)

(58) Field of Classification Search
None
See application file for complete search history.

(56) References Cited

U.S. PATENT DOCUMENTS

| | | | |
|---|---|---|---|
| 10,764,263 B2 | 9/2020 | Rossi | |
| 10,764,752 B1* | 9/2020 | Avetisov | H04W 12/08 |
| 11,444,925 B1* | 9/2022 | Patimer | G06F 21/305 |
| 2016/0119306 A1 | 4/2016 | Matthews et al. | |

OTHER PUBLICATIONS

What are Ephemeral Certificates, https://www.ssh.com/iam/ephemeral_access/, 2020, 4 Pages.
Miller,"SSH Agent Protocol", Internet Engineering Task Force (IETF) draftmiller-ssh-agent-04, Retrieved from Internet URL: https://www.ietf.org/archive/id/draft-miller-ssh-agent-04.txt, Dec. 10, 2019, 14 Pages.
Wang et al., "Session-based Access Control in Information-Centric Networks: Design and Analyses", https://www.semanticscholar.org/paper/Session-based-access-control-in-information-centric-Wang-Xu/cbd837363443c606d3aec485e7ed2e01597f5397, 2014, 8 pages.

* cited by examiner

*Primary Examiner* — Brandon Hoffman
(74) *Attorney, Agent, or Firm* — SHOOK, HARDY & BACON L.L.P.

(57) ABSTRACT

Technologies are shown for session centric access control of a remote connection that involve receiving a connection request, redirecting the request to a trusted authority, and receiving a redirection of the request along with a profile or role determined for the client. A container is created for a remote connection with a certificate and a public key along with an identifier for each endpoint authorized in association with the profile or role determined for the client. Single use credentials are created and a secure shell initialized for the remote connection using the credentials, certificate and public key. The secure shell is presented to the client and the credentials expired. When an access request for an endpoint is received via the shell, it is determined whether an identifier corresponding to the requested endpoint is stored in the container for the shell and, if so, access is allowed to the requested endpoint.

20 Claims, 9 Drawing Sheets

SESSION-CENTRIC ACCESS CONTROL FOR SECURE EPHEMERAL SHELLS

BACKGROUND

Currently, secure shells (SSHs) are often used to establish secure connections between a client and service. The SSH protocol generally uses SSH key pairs that are configured separately for the client and server. See Miller, D., *SSH Agent Protocol*, Internet Engineering Task Force (IETF) draft-miller-ssh-agent-04, (https://www.ietforg/archive/id/draft-miller-ssh-agent-04.txt).

SSH connections typically provide privileged access to environments with highly sensitive information. Generally, the security of SSHs is implemented utilizing key pairs. The generally configured separately for the client and server and can be self-provisioned.

Ephemeral SSH shells are SSH shells that provide certificate-based, time-limited access to an environment. An ephemeral SSH generally grants access for a limited period of time, e.g. five minutes, after which the certificate for the SSH automatically expires thereby terminating access to the environment.

Connections using ephemeral shells can be established using conventional encryption protocols, e.g. SSH/RDP/HTTPS. Access to a target host is typically authorized using widely available industry-standard certificates. To obtain access using a remote connection, a user typically logs in to a certificate authority (CA) each time they want to establish the remote connection.

It is with respect to these and other considerations that the disclosure made herein is presented.

SUMMARY

The disclosed technology is directed toward session-centric access control for secure ephemeral shells.

In certain simplified examples of the disclosed technologies, methods, systems or computer readable media for session centric access control of a remote connection in accordance with the disclosed technology involve receiving a remote connection request from a client, redirecting the remote connection request to a trusted authority, and receiving a redirection of the remote connection request along with a profile or role determined for the client. A container is created for a remote connection and a certificate and public key for the remote connection are stored in the container along with an identifier for each endpoint authorized in association with the profile or role determined for the client. Single use credentials are created and a secure shell initiated for the remote connection using the single use credentials, the certificate and the public key. The secure shell is presented to the client and the single use credentials expired.

These examples can also involve receiving an access request for an endpoint from the client via the secure shell and determining whether an identifier corresponding to the requested endpoint is stored in the container. If the identifier corresponding to the requested endpoint is stored in the container for the remote connection, then access to the requested endpoint is allowed.

In certain examples, the identifier for each endpoint authorized in association with the profile or role determined for the client is composed of a private key corresponding to the endpoint. In some examples, the single use credentials can include an unmapped pseudo user identifier and the expiration of the single use credentials can be accomplished by expiring the pseudo user identifier. In particular examples, the container can be a rootless container. Certain examples also involve defining a set of profiles or a set of roles and, for each profile or role, determining endpoints that are authorized for the profile or role.

Some examples further involve defining a set of task types and the operation of determining endpoints authorized for the profile or role involves determining the endpoints authorized for the profile or role along with one or more of the task types. The operation for storing in the container an identifier for each endpoint authorized in association with the profile or role determined for the client can be accomplished by storing in the container an identifier for each endpoint authorized in association with the profile and role determined for the client and the one or more task types.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
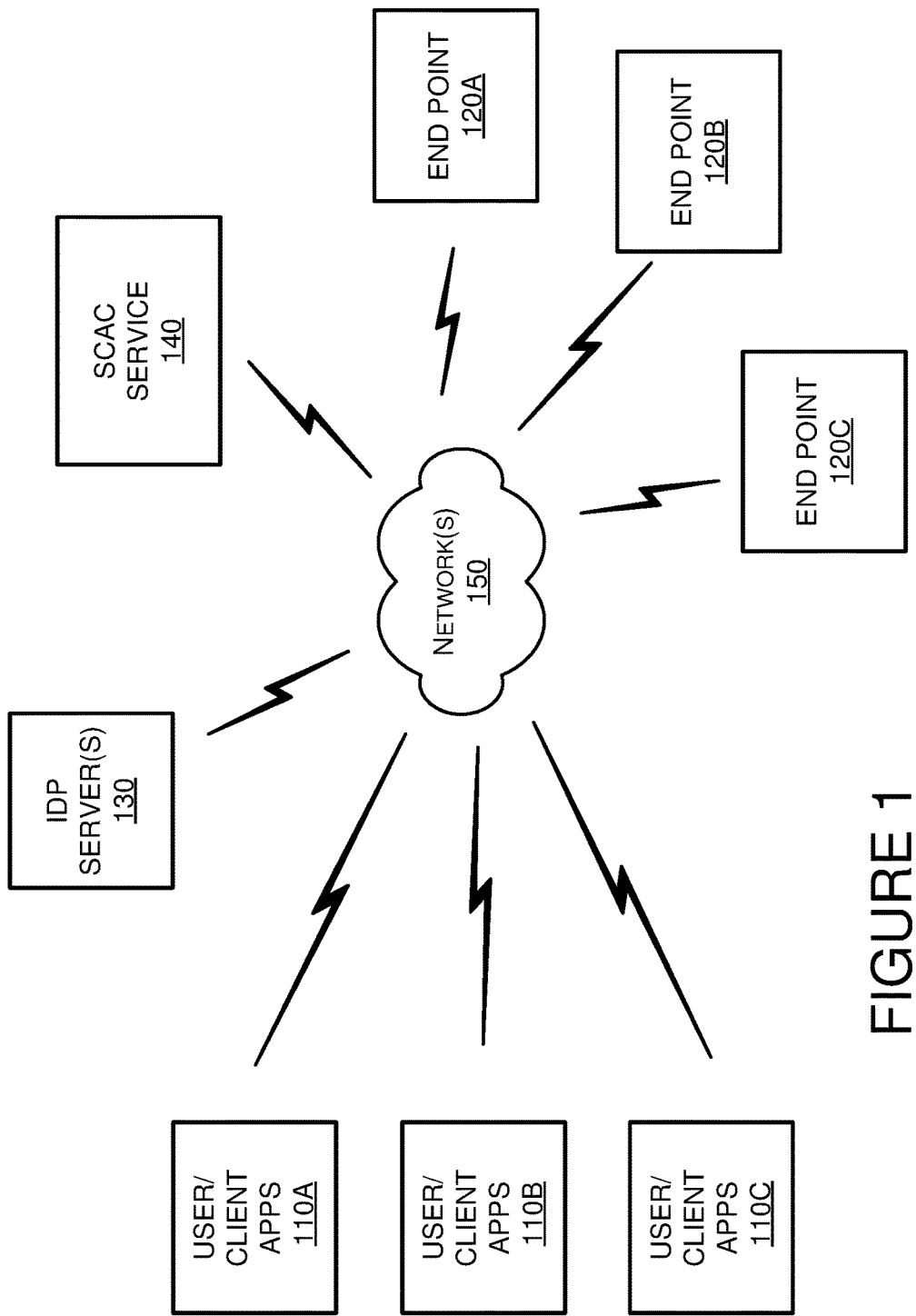
FIG. 1 is an architectural diagram showing an illustrative example of an architecture suitable for application of the disclosed technology for session-centric access control for ephemeral secure shells.

The following Detailed Description describes technologies for objective-based secure ephemeral shells that provide time-limited, session-centric access control (SCAC) for secure shells.

Secure shells (SSHs) can sometimes provide greater privileges or access to an environment than is needed for a given task, which can expose the environment to security risks. Ephemeral SSH shells can mitigate this exposure by limiting the access to the period of time associated with the certificate for the SSH connection. Nonetheless, while security is improved by limiting the time period of access in the ephemeral shell, the ephemeral shell can still provide access that is greater than is needed for the tasks to be performed using the ephemeral shell.

Examples of the disclosed technology can limit the scope of access of an ephemeral SSH to an environment. In these examples, an SSH is limited to a predetermined period of time and the scope of the permissions granted during this limited time period of the session. A technical advantage of the disclosed technology is that it can improve security by limiting both the time duration and the access provided by an SSH.

Another technical advantage of the disclosed technology is that the access granted by an ephemeral SSH can be tailored to the purpose of the session. The access can be based on a number of factors including, for example, a specific domain, user or task.

In certain examples, the disclosed technology can use rootless containers for an SSH. Some examples of the disclosed technology can also utilize authorized access identifiers stored in a secure database entry corresponding to the container for the secure shell.

These are simplified examples and many factors may be considered in a time-limited, session-centric access control for secure shells of the disclosed technology.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

By the use of the technologies described herein, an ephemeral SSH with session-centric access control is created that limits access to an environment using an SSH to a limited period of time for a session of the SSH and a limited scope of access that can be defined for a task of the session. Other technical effects other than those mentioned herein can also be realized from implementation of the technologies disclosed herein.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for session centric access control of a remote connection will be described. As will be described in more detail below with respect to the figures, there are a number of applications and services that may embody the functionality and techniques described herein.

FIG. 1 is an architectural diagram showing an illustrative example of an architecture 100 suitable for application of the disclosed technology for session-centric access control for ephemeral secure shells. In the example of FIG. 1, a client, such as a user/client applications 110, endpoints 120, IDP server or servers 130 and secure access control service 140 are in communication with one another via network 150.

Examples of user/client applications 110 can be user client devices, such as mobile smartphone devices or personal computers, or applications executing on user client devices, such as browsers, productivity applications or communication applications. Examples of endpoints 120 can include servers or services, such as financial, social networking, communications or data services.

For example, a user/client application 110 can will establish a remote connection with an endpoint 120 to perform a variety of tasks, such as authentication, communications or data access. Generally, an ephemeral SSH for a remote connection with session-centric access control in accordance with the disclosed technology will be established between a user/client application 110 and an endpoint 120.

IDP 130 is an identity provider (IDP) system or service entity that creates, maintains, and manages identity information and provides authentication services to relying applications within a network. IDPs are typically trusted authorities that generally offer user authentication as a service. Relying party applications, such as web applications, often outsource the user authentication step to a trusted identity provider. For example, authentication of a user of a user/client application 110 when obtaining access to an endpoint 120 can be outsourced to a trusted authority, such as IDP 130.

Figure 2:
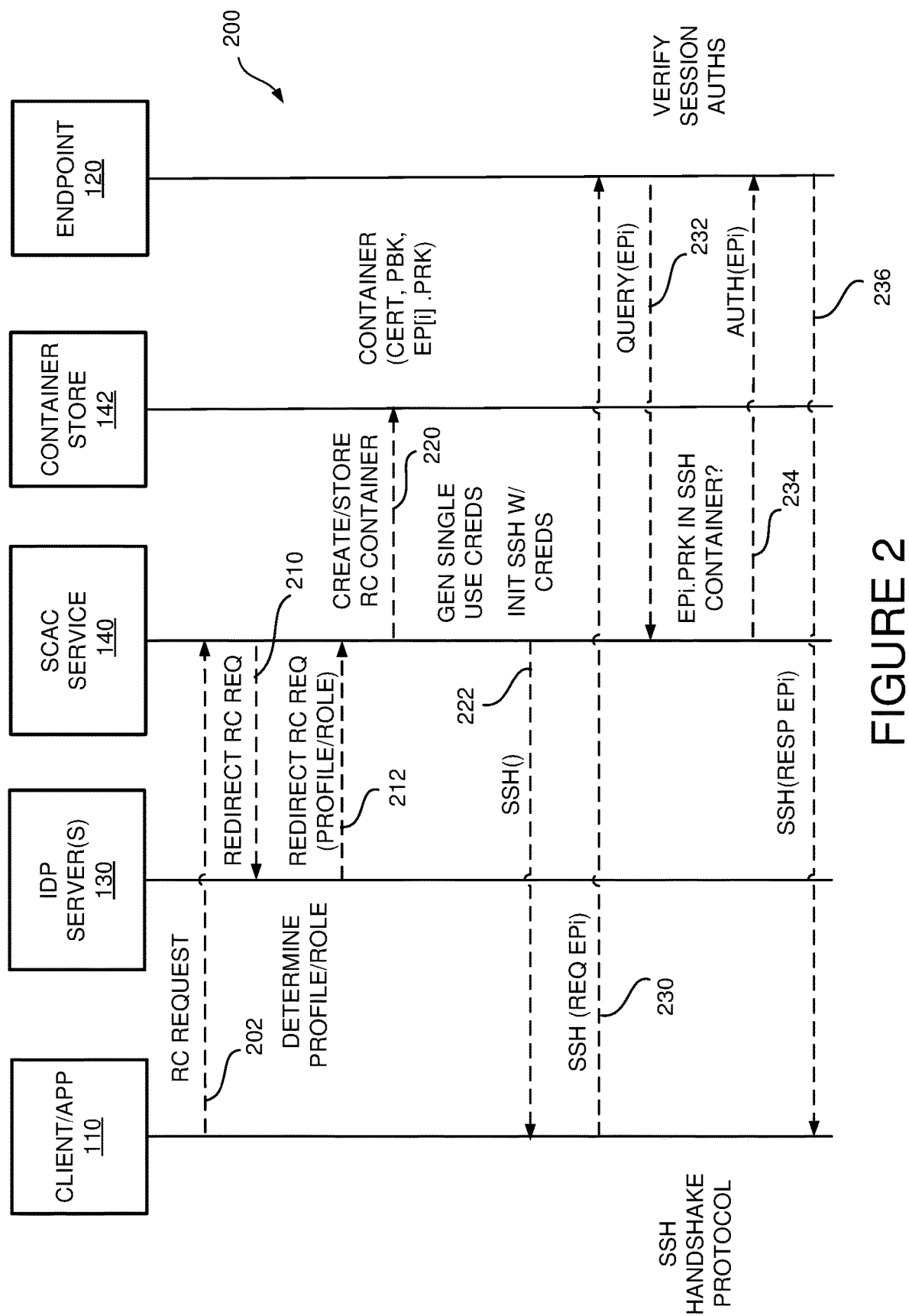
FIG. 2 is a messaging diagram illustrating an example of a messaging exchange for establishing an ephemeral secure shell for a client in accordance with the disclosed technology.

FIG. 2 is a messaging diagram illustrating an example of a messaging exchange 200 for establishing an SSH for a client in accordance with the disclosed technology. At 202, User/client application 110 submits a remote connection (RC) request to SCAC service 140. At 210, SCAC service 140 redirects the remote connection request to trusted authority IDP server 130. IDP server 130 determines a profile or role for user/client 110 and, at 212, redirects the remote connection request back to SCAC service 140 with the profile or role determined for user/client 110.

At 220, SCAC service 140 creates a container for the remote connection that is stored in container store 142. One example of a container for the remote connection can include a certificate and a public key (PBK) along with an array EP[i] that includes a private key (PRK) for each endpoint 120 authorized in association with the profile or role of the user/client 110. SCAC service 140 generates single use credentials and initiates an SSH with the certificate, the public key and using the single use credentials. The single use credentials, e.g. an unmapped pseudo user ID, is expired, which prevents further logins using the credentials.

Note that the single use credentials can be obtained in a variety of methods, such as obtaining the credentials through user input on client 110 or submitting the credentials by a security application, e.g. an SSH agent, residing on client 110. Upon successful login of client 110 to the SSH, SCAC service 140, at 222, presents the SSH endpoint socket to the user/client 110.

At 230, client 110 can submit an access request Req EPi to a particular Endpoint 120 via the SSH using the SSH handshake protocol. At 232, the Endpoint 120 queries SCAC service 140 to verify that access to the endpoint EPi is authorized for the SSH session for client 110.

SCAC service 140 determines whether the private key PRK for the requested endpoint 120, e.g. EPi, is stored in the EP[i] array for the container in storage 142 for the SSH. If the private key PRK for the requested Endpoint 120 is found in the container for the SSH, then SCAC service 140 responds, at 234, with a message to Endpoint 120 indicating that the client is authorized to access the endpoint EPi in the SSH. Endpoint 120 processes the request and sends a response, at 236, to the request to client 110 via the SSH. If the PRK for the requested endpoint EPi is not found in the container for the SSH, then access to the endpoint is denied.

Figure 3A:
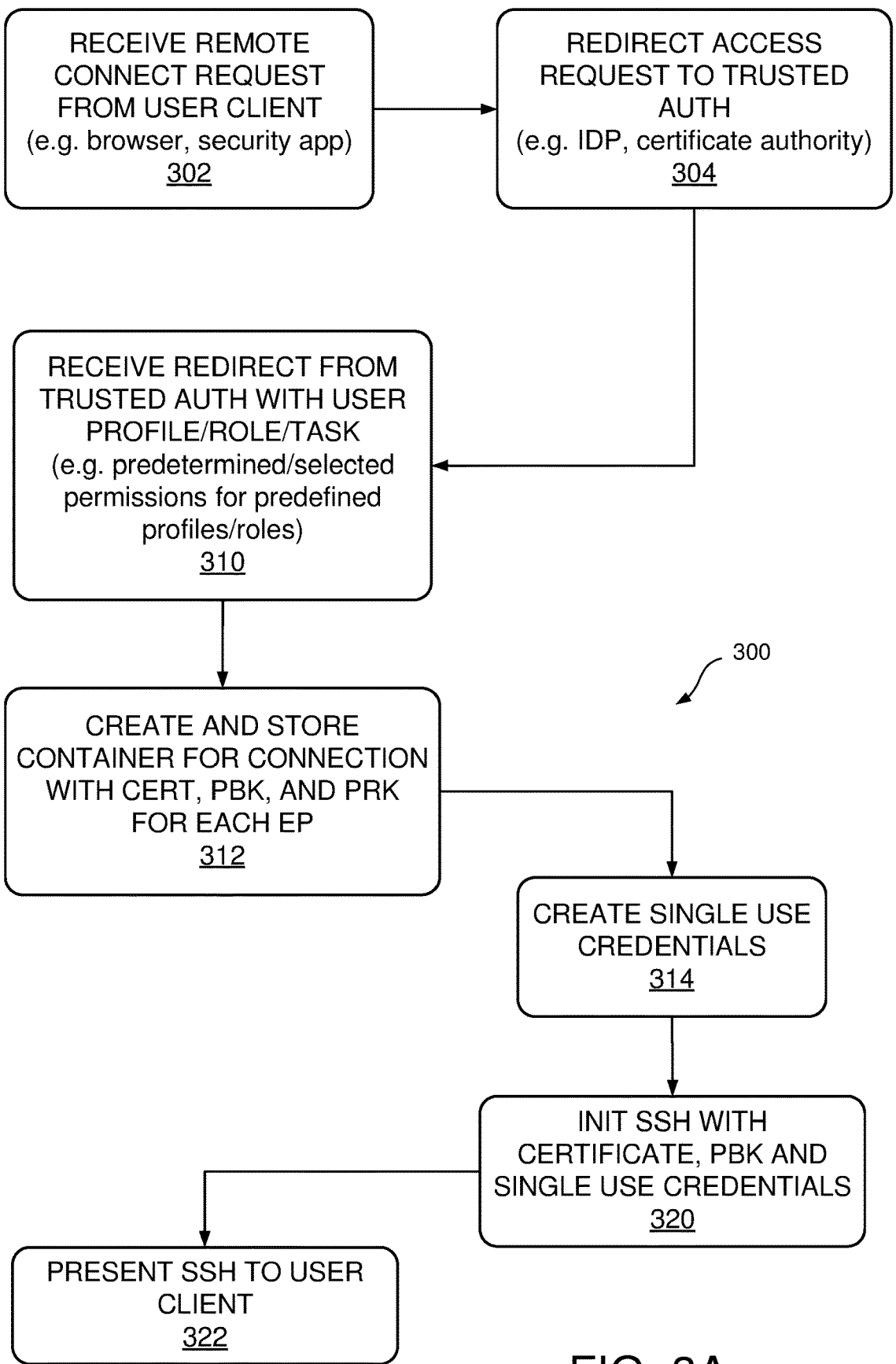
FIG. 3A is a control flow diagram illustrating an example of a process for establishing an SSH for a user in accordance with the disclosed technology.

FIG. 3A is a control flow diagram illustrating an example of a process 300, such as a process executing in SCAC 140, for establishing an SSH for a user in accordance with the disclosed technology. At 302, a remote connection request from a user client, such as a browser or security application residing on client 110, is received by a SCAC service. At 304, the remote connection request is redirected to a trusted authority, such as IDP 130 or a certificate authority.

The trusted authority determines a user profile or role for the user associated with the remote connection request from client 110. For example, an administrator can predefine user profiles or roles and associate the profiles or roles with an individual user or domain. In certain examples, the trusted authority can determine a profile or role for the user based on the user's identity being associated with a particular domain. In other examples, the identity of a particular user can be associated with a particular role, e.g. administrator, support or end user. In some examples, the user can be presented with a prompt to select a profile or role for a session via a user interface on client 110. In other examples, the profile or role can be predetermined on the trusted authority for a user or set of users.

The trusted authority determines a user profile or role for the remote connection request from client 110 and redirects the remote connection request back to the SCAC service with the determined user profile or role. In some examples, the trusted authority can also provide a certificate and public key PBK for encryption and private keys PRKs for specific endpoints 120.

Each particular profile or role has associated permissions defined for it. For example, an administrator can select the permissions for each profile or role when defining each user profile or role. In some examples, the endpoints 120 are defined to which a user profile or role is permitted access.

At 310, the SCAC service receives the redirected remote connection request from the trusted authority with the determined user profile or role. In some examples, the permissions associated with specific user profiles or roles are stored in the SCAC service. At 312, the SCAC service creates and stores a container for an SSH for the remote connection that includes a certificate and public key PBK for the SSH and private keys PRKs for each of the endpoints that the SSH permits access to in accordance with the permissions associated with the determined user profile or role received from the trusted authority. In some examples, the container can be a rootless container.

At 314, the SCAC service generates single use credentials that are used with the certificate and public key to initiate, at 320, an SSH for the remote connection. The single use credentials, e.g. an unmapped pseudo user identifier, are expired after first use to prevent further logins using the credentials. At 322, the SSH socket is presented to the user client.

Figure 3B:
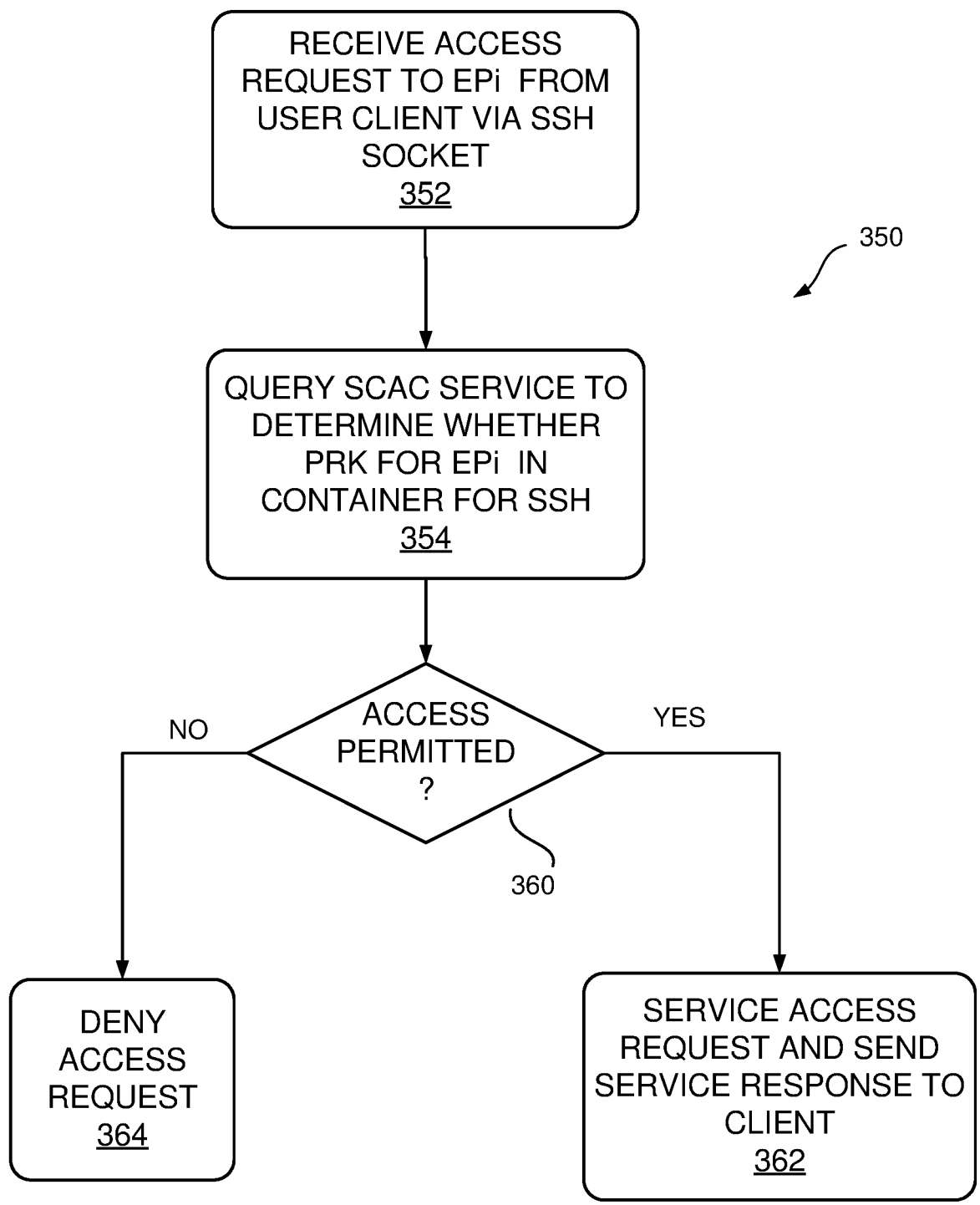
FIG. 3B is a control flow diagram illustrating an example of a process for handling access requests from a client via the SSH socket for the remote connection in accordance with the disclosed technology.

FIG. 3B is a control flow diagram illustrating an example of a process 350, such as a process executing in an endpoint 120, for handling access requests from client 110 via the SSH socket for the remote connection in accordance with the disclosed technology.

At 352, an access request, such as a request from a user client via the SSH socket for the remote connection, is received in an endpoint, such as one of endpoints 120. At 354, an SCAC service, such as SCAC service 140, is queried by the endpoint EPi, to determine whether access to the endpoint is permitted for the SSH of the remote connection.

If the SCAC service responds to the query with an indication that access to endpoint EPi is permitted, then control branches at 360 to 362, where the endpoint services the access request and send a service response to the client via the SSH for the remote connection. If SCAC service responds to the query with an indication that access to EPi is not permitted for the SSH, then control branches at 360 to 364 to deny access to the EPi.

Figure 3C:
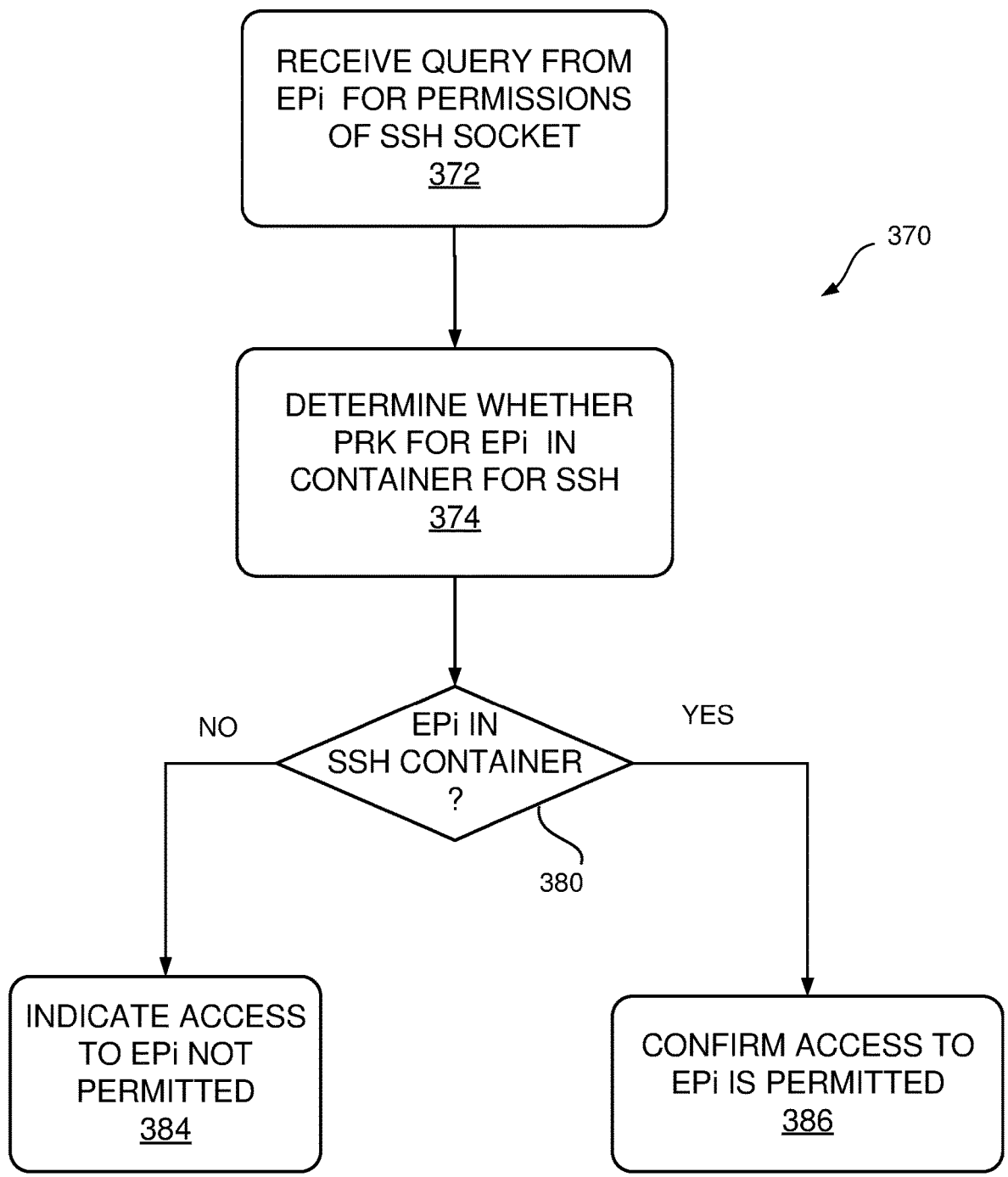
FIG. 3C is a control flow diagram illustrating an example of a process executing in an SCAC service for handling a query from an endpoint regarding endpoint access permissions for an SSH socket for a remote connection in accordance with the disclosed technology.

FIG. 3C is a control flow diagram illustrating an example of a process 370 executing in an SCAC service, such as SCAC 140, for handling a query from an endpoint 120 regarding endpoint access permissions for an SSH socket for a remote connection in accordance with the disclosed technology.

At 372, a query is received from an endpoint EPi regarding permissions for an SSH socket. At 374, the container for the SSH is checked to determine whether the private key PRK for the endpoint EPi can be found in the container. If the PRK for endpoint EPi if found in the container for the SSH, then control branches at 380 to 386 to send confirmation to the endpoint EPi that access is permitted. If the PRK for the endpoint EPi is not found in the container, then control branches at 380 to 384 to send an indication that access to endpoint EPi is not permitted for the SSH.

Note that, in some examples, access permissions can be defined based on a type of task requested in addition to the user profile or role. These examples can further restrict the access of a remote request of an SSH to particular endpoints permitted for the task particular tasks, e.g. a user can be permitted access to certain endpoint for one type of task and permitted access to another endpoint for a different type of task.

In these examples, the tasks can be defined in an SCAC service by an administrator and a container for an SSH can differentiate the endpoints accessible for different types of requests, e.g. the container would include each task type and the permissible endpoints EPi associated with each task type. A query from an endpoint EPi to the SCAC service to determine access to the endpoint for an SSH remote access request, e.g. the query at 354, would include the task type of the service request submitted via the SSH socket. The SCAC service would determine, e.g. at 374, whether the private key PRK for the endpoint EPi is stored in the in association with the task type in the container for the SSH. Other implementations with additional definitions and criteria for controlling the permissions for an SSH session are possible in accordance with the disclosed technology.

Figure 4A:
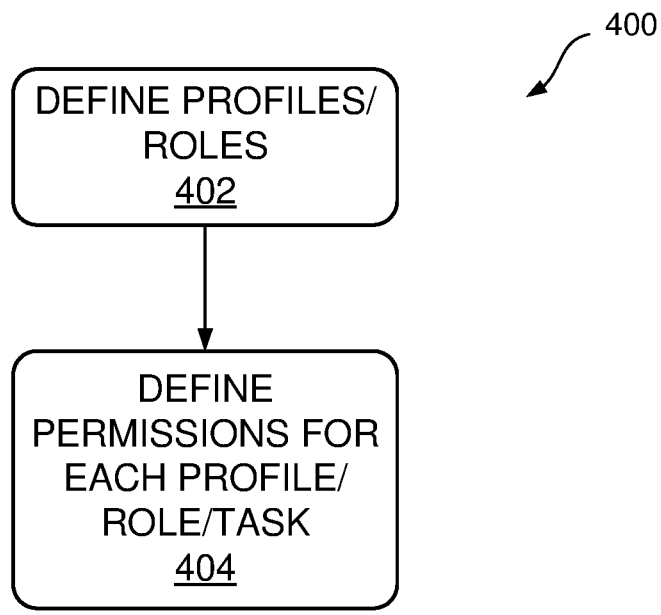
FIG. 4A is a control flow diagram illustrating an example of a process 400 for defining profiles or roles and defining permissions for each profile or role in accordance with the disclosed technology.

FIG. 4A is a control flow diagram illustrating an example of a process 400 for defining profiles or roles and defining permissions for each profile or role in accordance with the disclosed technology.

In this example, at 402, one or more profiles or roles are defined for users. For example, a system or domain administrator can define a set of user profiles or a set of user roles that can be associated with users or domains. The administrator can, in some examples, define a profile or role for a set of users, a class of users or a domain. In other examples, the administrator can define a set of rules that can be used to determine the association between a user and a particular profile or role. In some examples, the operation at 402 can occur in a trusted authority, e.g. IDP service 130. A variety of approaches can be utilized to associate a user with a profile or role in accordance with the disclosed technology.

At 404, an administrator can define permissions for the profiles or roles defined in 402. For example, an administrator, e.g. using an administrative interface for SCAC 140, can define the endpoints, e.g. endpoints 120, that a particular user profile or role is authorized to access during a session. In other examples, rules can be defined for determining the authorized endpoints for a profile or role.

In particular examples, an administrator can similarly define permissions associated with a particular task or define rules that can determine the permissions associated with a particular task. The definitions or rules can, in certain examples, be based on a combination of profile, role and task or other criteria.

The permissions can take the form of private keys PRK corresponding to each authorized endpoint. The permissions so defined can determine or control the endpoints accessible during a session of a remote connection SSH.

Figure 4B:
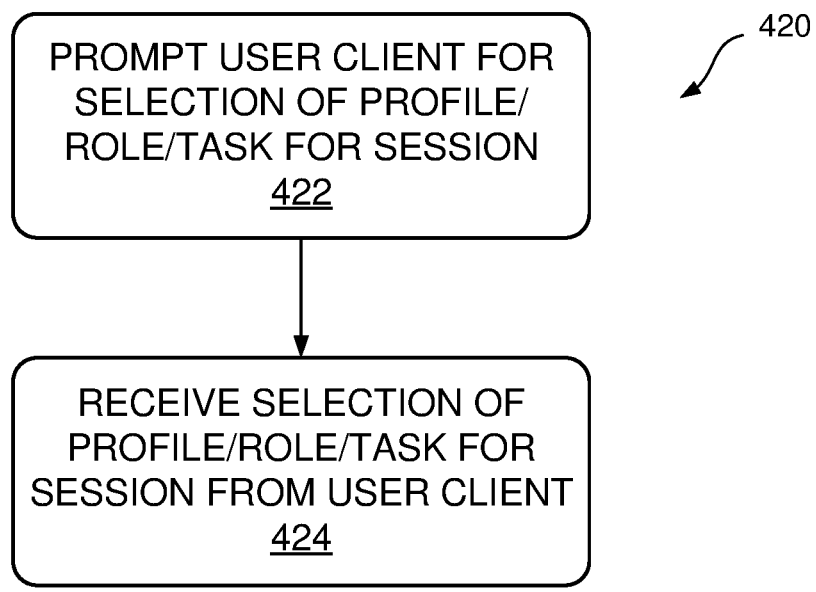
FIG. 4B is a control flow diagram illustrating an example of a process for user selection of a profile or role for a session of an SSH in accordance with the disclosed technology.

FIG. 4B is a control flow diagram illustrating an example of a process process 420 for user selection of a profile or role for a session of an SSH in accordance with the disclosed technology. At 422, the user is prompted through a user interface of a client device, e.g. device 110, to query a user for selection of a profile or role for a session via the user interface. For example, a set of available profiles or roles can be defined by an administrator and that set can be presented to the user for selection.

At 424, the user's selection of a profile or role via a user interface is received from the user client. The selected profile or role is used to determine the permissions for the SSH for the session.

It should be appreciated that a variety of different instrumentalities and methodologies can be utilized to perform session centric access control of ephemeral secure shells without departing from the teachings of the disclosed technology. The disclosed technology provides a high degree of flexibility and variation in the configuration of implementations without departing from the teachings of the present disclosure.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach to session centric access control of a remote connection. The specific examples of different aspects of session centric access control of a remote connection described herein are illustrative and are not intended to limit the scope of the techniques shown.

Figure 6:
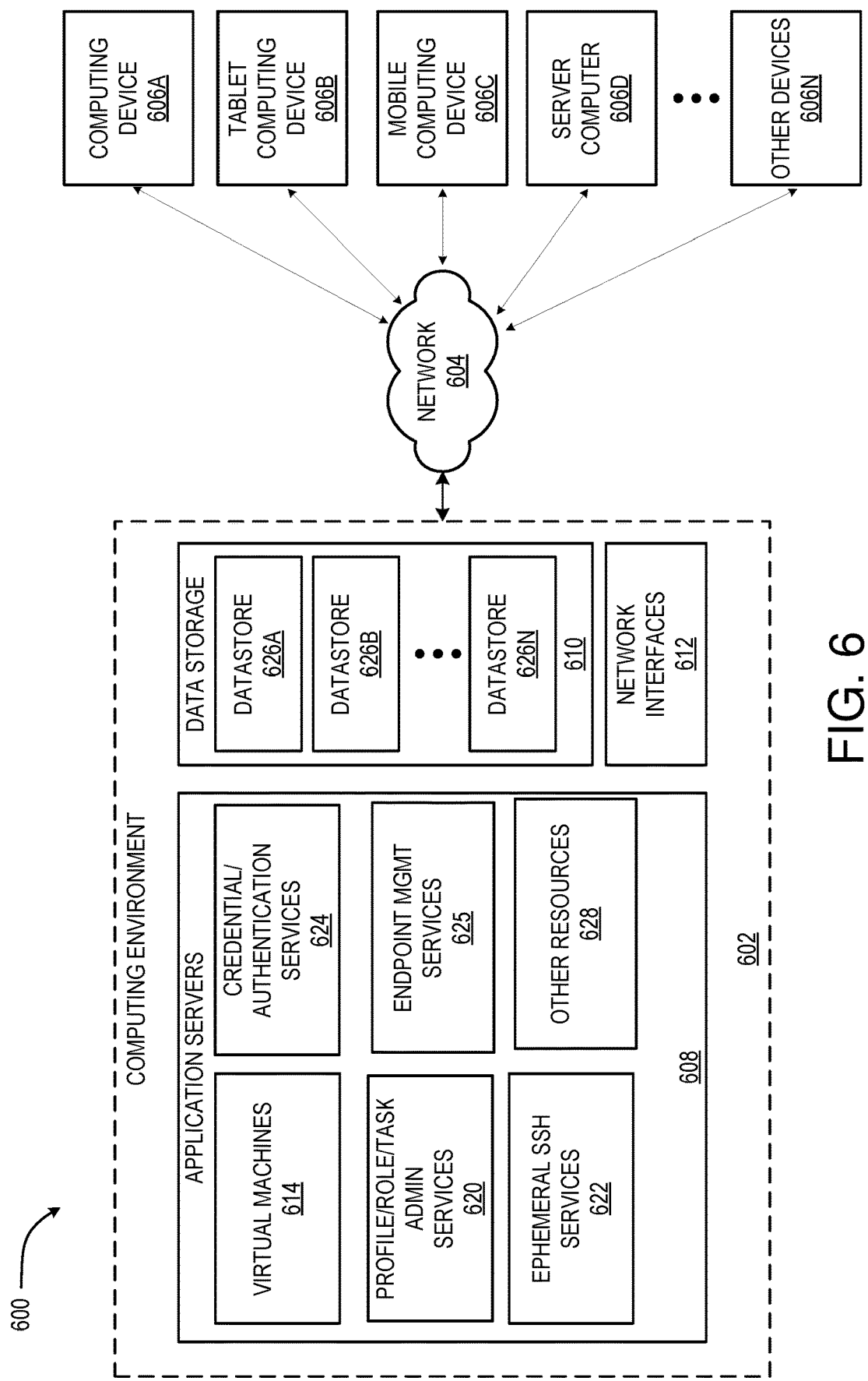
FIG. 6 is a diagram illustrating a distributed computing environment capable of implementing aspects of the techniques and technologies presented herein.

Computer Architectures for Session Centric Access Control of a Remote Connection Note that at least parts of processes 300, 350, 370, 400 and 420 of FIGS. 3A, 3B, 3C, 4A and 4B and other processes and operations pertaining to session centric access control of a remote connection described herein may be implemented in one or more servers, such as computer environment 600 in FIG. 6, or the cloud, and data defining the results of user control input signals translated or interpreted as discussed herein may be communicated to a user device for display. Alternatively, the session centric access control of a remote connection processes may be implemented in multiple services implemented on different platforms. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 300, 350, 370, 400 and 420 of FIGS. 3A, 3B, 3C, 4A and 4B) are described herein as being implemented, at least in part, by an application, component, and/or circuit. Although the following illustration refers to the components of FIGS. 3A-C, 4A and 4B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 300, 350, 370, 400 and 420 of FIGS. 3A, 3B, 3C, 4A and 4B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 5:
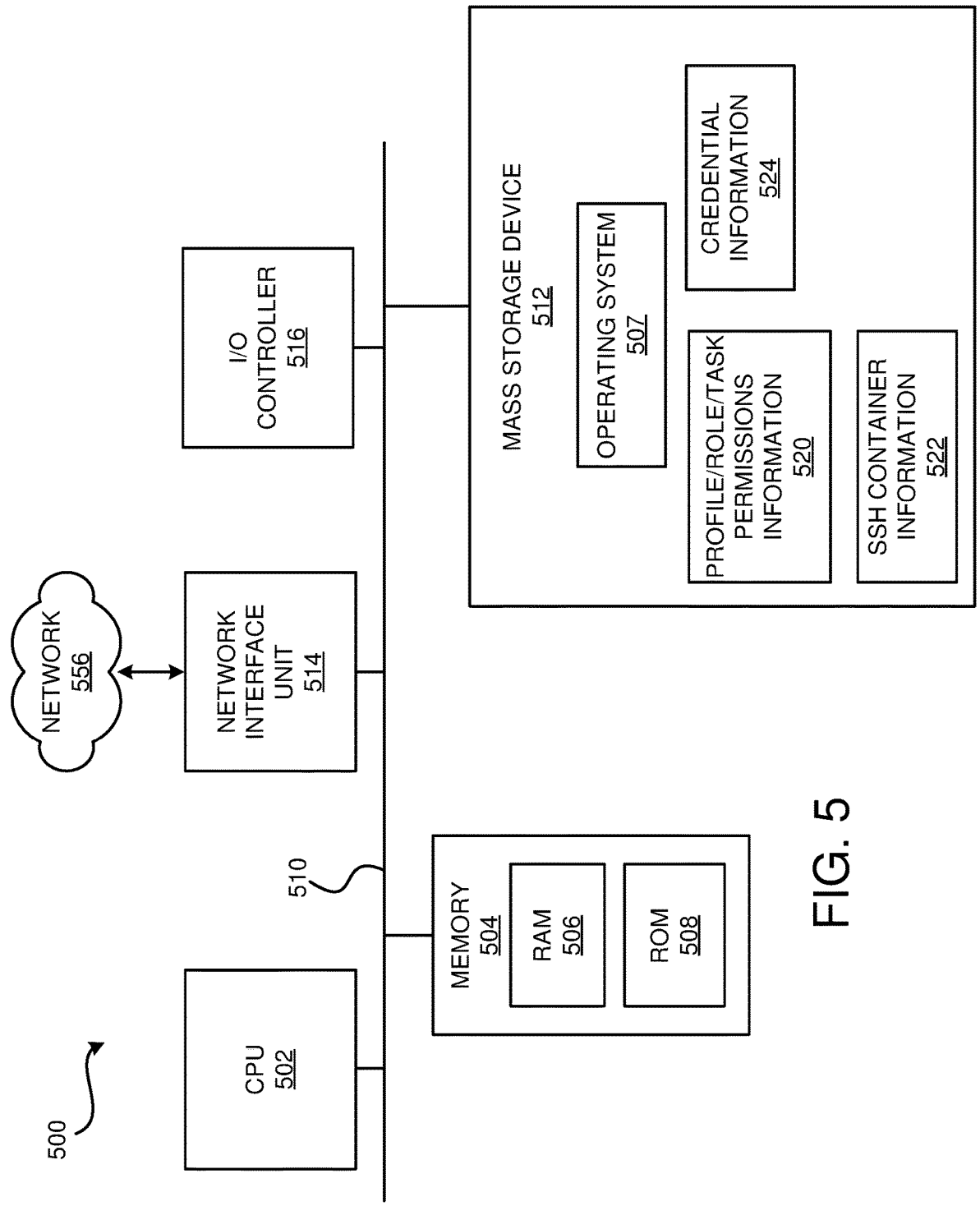
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a computer, such as the devices 110 and 120A-C (FIGS. 1 and 2), capable of executing the program components described herein. Thus, the computer architecture 500 illustrated in FIG. 5 illustrates an architecture for an on-board vehicle computer, a server computer, mobile phone, a PDA, a smart phone, a desktop computer, a netbook computer, a tablet computer, an on-board computer, a game console, and/or a laptop computer. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between sub-elements within the computer architecture 500, such as during startup, is stored in the ROM 508. The computer architecture 500 further includes a mass storage device 512 for storing an operating system 507, data (such as profile, role or task information 520, SSH container information 522, and credential information 524), and one or more application programs.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 500. For purposes the claims, the phrase "computer storage medium," "computer-readable storage medium" and variations thereof, does not include waves, signals, and/or other transitory and/or intangible communication media, per se.

According to various configurations, the computer architecture 500 may operate in a networked environment using logical connections to remote computers through the network 556 and/or another network (not shown). The computer architecture 500 may connect to the network 556 through a network interface unit 514 connected to the bus 510. It should be appreciated that the network interface unit 514 also may be utilized to connect to other types of networks and remote computer systems. The computer architecture 500 also may include an input/output controller 516 for receiving and processing input from a number of other devices, including a keyboard, mouse, game controller, television remote or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, in response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

FIG. 6 depicts an illustrative distributed computing environment 600 capable of executing the software components described herein for session centric access control of a remote connection. Thus, the distributed computing environment 600 illustrated in FIG. 6 can be utilized to execute many aspects of the software components presented herein. For example, the distributed computing environment 600 can be utilized to execute one or more aspects of the software components described herein.

According to various implementations, the distributed computing environment 600 includes a computing environment 602 operating on, in communication with, or as part of the network 604. The network 604 may be or may include the network 556, described above. The network 604 also can include various access networks. One or more client devices 606A-806N (hereinafter referred to collectively and/or generically as "clients 606") can communicate with the computing environment 602 via the network 604 and/or other connections (not illustrated in FIG. 6). In one illustrated configuration, the clients 606 include a computing device 606A, such as a laptop computer, a desktop computer, or other computing device; a slate or tablet computing device ("tablet computing device") 606B; a mobile computing device 606C such as a mobile telephone, a smart phone, an on-board computer, or other mobile computing device; a server computer 606D; and/or other devices 606N, which can include a hardware security module. It should be understood that any number of devices 606 can communicate with the computing environment 602. Two example computing architectures for the devices 606 are illustrated and described herein with reference to FIGS. 5 and 7. It should be understood that the illustrated devices 606 and computing architectures illustrated and described herein are illustrative only and should not be construed as being limited in any way.

In the illustrated configuration, the computing environment 602 includes application servers 608, data storage 610, and one or more network interfaces 612. According to various implementations, the functionality of the application servers 608 can be provided by one or more server computers that are executing as part of, or in communication with, the network 604. The application servers 608 can host various services, virtual machines, portals, and/or other resources. In the illustrated configuration, the application servers 608 host one or more virtual machines 614 for hosting applications or other functionality. According to various implementations, the virtual machines 614 host one or more applications and/or software modules for session centric access control of a remote connection. It should be understood that this configuration is illustrative only and should not be construed as being limiting in any way.

According to various implementations, the application servers 608 also include one or more profile, role or task administration services 620, ephemeral SSH services 622, credential and authentication services 624 and endpoint management services 625. The profile, role or task administration services 620 can includes services for defining profiles or roles for users and/or the permissions for profiles, roles or tasks. The ephemeral services 622 can include services for maintaining containers for SSH remote connections. The credential and authentication services 624 can include services for authenticating users and defining a profile or role for an SSH session. The endpoint management services 625 can include services for managing information pertaining to endpoints.

As shown in FIG. 6, the application servers 608 also can host other services, applications, portals, and/or other resources ("other resources") 628. The other resources 628 can include, but are not limited to, data encryption, data sharing, or any other functionality.

As mentioned above, the computing environment 602 can include data storage 610. According to various implementations, the functionality of the data storage 610 is provided by one or more databases or data stores operating on, or in communication with, the network 604. The functionality of the data storage 610 also can be provided by one or more server computers configured to host data for the computing environment 602. The data storage 610 can include, host, or provide one or more real or virtual data stores 626A-826N (hereinafter referred to collectively and/or generically as "datastores 626"). The datastores 626 are configured to host data used or created by the application servers 608 and/or other data. Aspects of the datastores 626 may be associated with services for a session centric access control of a remote connection. Although not illustrated in FIG. 6, the datastores 626 also can host or store web page documents, word documents, presentation documents, data structures, algorithms for execution by a recommendation engine, and/or other data utilized by any application program or another module.

The computing environment 602 can communicate with, or be accessed by, the network interfaces 612. The network interfaces 612 can include various types of network hardware and software for supporting communications between two or more computing devices including, but not limited to, mobile client vehicles, the clients 606 and the application servers 608. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 may provide the software functionality described herein as a service to the clients using devices 606. It should be understood that the devices 606 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 600 to utilize the functionality described herein for session centric access control of a remote connection, among other aspects.

Figure 7:
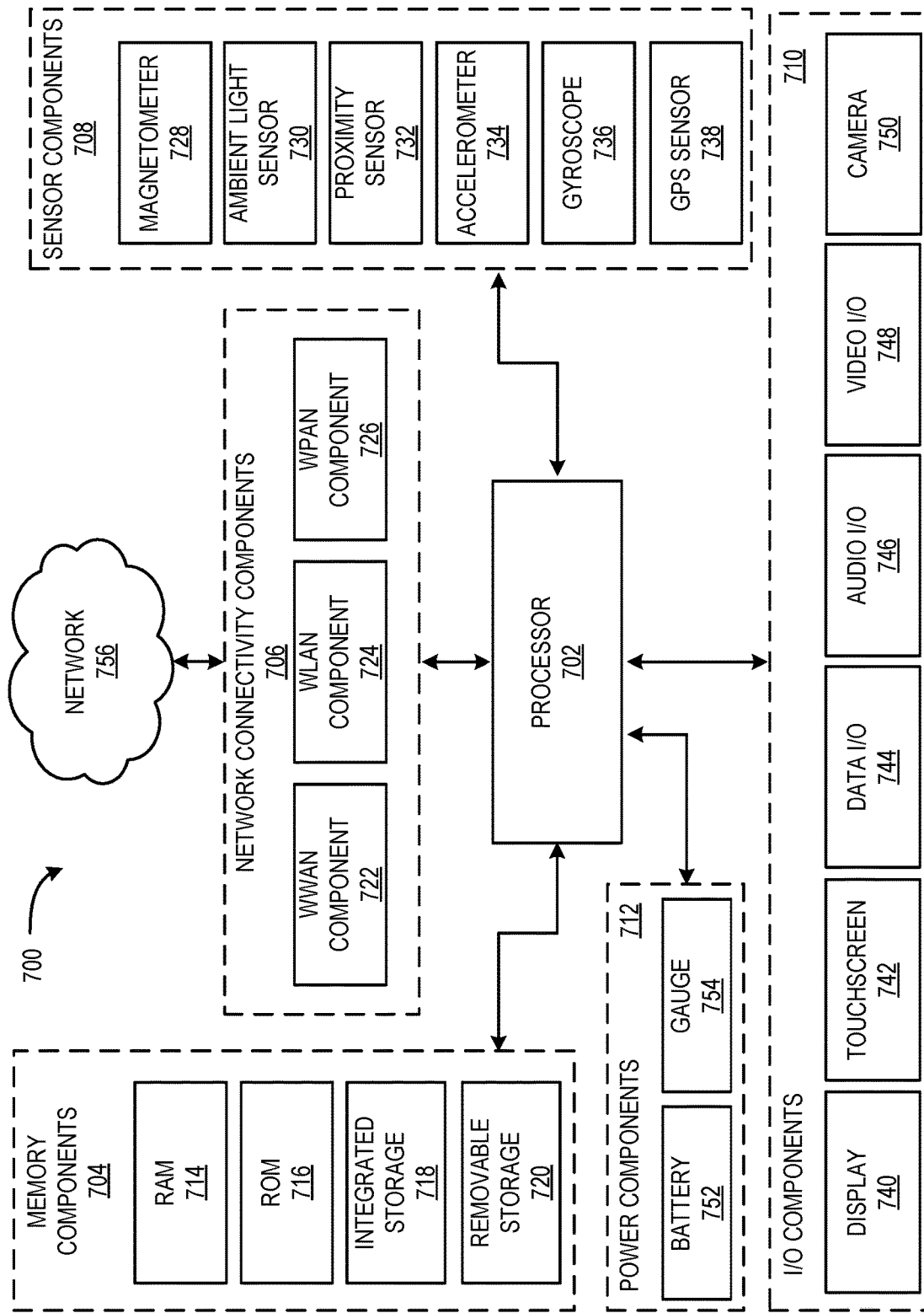
FIG. 7 is a computer architecture diagram illustrating a computing device architecture for a computing device capable of implementing aspects of the techniques and technologies presented herein.

Turning now to FIG. 7, an illustrative computing device architecture 700 for a computing device that is capable of executing various software components is described herein for session centric access control of a remote connection. The computing device architecture 700 is applicable to computing devices such as mobile clients in vehicles. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 700 is applicable to the client device 110 and client/servers 120A-C shown in FIGS. 1, 2A-C, and computing device 606A-N shown in FIG. 6.

The computing device architecture 700 illustrated in FIG. 7 includes a processor 702, memory components 704, network connectivity components 706, sensor components 708, input/output components 710, and power components 712. In the illustrated configuration, the processor 702 is in communication with the memory components 704, the network connectivity components 706, the sensor components 708, the input/output ("I/O") components 710, and the power components 712. Although no connections are shown between the individual components illustrated in FIG. 7, the components can interact to carry out device functions. In some configurations, the components are arranged so as to communicate via one or more busses (not shown).

The processor 702 includes a central processing unit ("CPU") configured to process data, execute computer-executable instructions of one or more application programs, and communicate with other components of the computing device architecture 700 in order to perform various functionality described herein. The processor 702 may be utilized to execute aspects of the software components presented herein and, particularly, those that utilize, at least in part, secure data.

In some configurations, the processor 702 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620 P, 1080 P, and higher resolution), video games, three-dimensional ("3D") modeling applications, and the like. In some configurations, the processor 702 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 702 is, or is included in, a system-on-chip ("SoC") along with one or more of the other components described herein below. For example, the SoC may include the processor 702, a GPU, one or more of the network connectivity components 706, and one or more of the sensor components 708. In some configurations, the processor 702 is fabricated, in part, utilizing a package-on-package ("PoP") integrated circuit packaging technique. The processor 702 may be a single core or multi-core processor.

The processor 702 may be created in accordance with an ARM architecture, available for license from ARM HOLDINGS of Cambridge, United Kingdom. Alternatively, the processor 702 may be created in accordance with an x86 architecture, such as is available from INTEL CORPORATION of Mountain View, California and others. In some configurations, the processor 702 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 704 include a random access memory ("RAM") 714, a read-only memory ("ROM") 716, an integrated storage memory ("integrated storage") 718, and a removable storage memory ("removable storage") 720. In some configurations, the RAM 714 or a portion thereof, the ROM 716 or a portion thereof, and/or some combination of the RAM 714 and the ROM 716 is integrated in the processor 702. In some configurations, the ROM 716 is configured to store a firmware, an operating system or a portion thereof (e.g., operating system kernel), and/or a bootloader to load an operating system kernel from the integrated storage 718 and/or the removable storage 720.

The integrated storage 718 can include a solid-state memory, a hard disk, or a combination of solid-state memory and a hard disk. The integrated storage 718 may be soldered or otherwise connected to a logic board upon which the processor 702 and other components described herein also may be connected. As such, the integrated storage 718 is integrated in the computing device. The integrated storage 718 is configured to store an operating system or portions thereof, application programs, data, and other software components described herein.

The removable storage 720 can include a solid-state memory, a hard disk, or a combination of solid-state memory and a hard disk. In some configurations, the removable storage 720 is provided in lieu of the integrated storage 718. In other configurations, the removable storage 720 is provided as additional optional storage. In some configurations, the removable storage 720 is logically combined with the integrated storage 718 such that the total available storage is made available as a total combined storage capacity. In some configurations, the total combined capacity of the integrated storage 718 and the removable storage 720 is shown to a user instead of separate storage capacities for the integrated storage 718 and the removable storage 720.

The removable storage 720 is configured to be inserted into a removable storage memory slot (not shown) or other mechanism by which the removable storage 720 is inserted and secured to facilitate a connection over which the removable storage 720 can communicate with other components of the computing device, such as the processor 702. The removable storage 720 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 704 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSOFT AZURE from Microsoft Corporation of Redmond, Washington or AWS from Amazon Corporation of Seattle, Washington. The operating system may also include WINDOWS MOBILE OS from Microsoft Corporation of Redmond, Washington, WINDOWS PHONE OS from Microsoft Corporation, WINDOWS from Microsoft Corporation, MAC OS or IOS from Apple Inc. of Cupertino, California, and ANDROID OS from Google Inc. of Mountain View, California Other operating systems are contemplated.

The network connectivity components 706 include a wireless wide area network component ("WWAN component") 722, a wireless local area network component ("WLAN component") 724, and a wireless personal area network component ("WPAN component") 726. The network connectivity components 706 facilitate communications to and from the network 756 or another network, which may be a WWAN, a WLAN, or a WPAN. Although only the network 756 is illustrated, the network connectivity components 706 may facilitate simultaneous communication with multiple networks, including the network 756 of FIG. 7. For example, the network connectivity components 706 may facilitate simultaneous communications with multiple networks via one or more of a WWAN, a WLAN, or a WPAN.

The network 756 may be or may include a WWAN, such as a mobile telecommunications network utilizing one or more mobile telecommunications technologies to provide voice and/or data services to a computing device utilizing the computing device architecture 700 via the WWAN component 722. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 756 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 756 may be configured to provide voice and/or data communications with any combination of the above technologies. The network 756 may be configured to or be adapted to provide voice and/or data communications in accordance with future generation technologies.

In some configurations, the WWAN component 722 is configured to provide dual-multi-mode connectivity to the network 756. For example, the WWAN component 722 may be configured to provide connectivity to the network 756, wherein the network 756 provides service via GSM and UMTS technologies, or via some other combination of technologies. Alternatively, multiple WWAN components 722 may be utilized to perform such functionality, and/or provide additional functionality to support other non-compatible technologies (i.e., incapable of being supported by a single WWAN component). The WWAN component 722 may facilitate similar connectivity to multiple networks (e.g., a UMTS network and an LTE network).

The network 756 may be a WLAN operating in accordance with one or more Institute of Electrical and Electronic Engineers ("IEEE") 602.11 standards, such as IEEE 602.11a, 602.11b, 602.11g, 602.11n, and/or future 602.11 standard (referred to herein collectively as WI-FI). Draft 602.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 724 is configured to connect to the network 756 via the WI-FI access points. Such connections may be secured via various encryption technologies including, but not limited to, WI-FI Protected Access ("WPA"), WPA2, Wired Equivalent Privacy ("WEP"), and the like.

The network 756 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 726 is configured to facilitate communications with other devices, such as peripherals, computers, or other computing devices via the WPAN.

The sensor components 708 include a magnetometer 728, an ambient light sensor 730, a proximity sensor 732, an accelerometer 734, a gyroscope 736, and a Global Positioning System sensor ("GPS sensor") 738. It is contemplated that other sensors, such as, but not limited to, temperature sensors or shock detection sensors, also may be incorporated in the computing device architecture 700.

The I/O components 710 include a display 740, a touchscreen 742, a data I/O interface component ("data I/O") 744, an audio I/O interface component ("audio I/O") 746, a video I/O interface component ("video I/O") 748, and a camera 750. In some configurations, the display 740 and the touchscreen 742 are combined. In some configurations two or more of the data I/O component 744, the audio I/O component 746, and the video I/O component 748 are combined. The I/O components 710 may include discrete processors configured to support the various interfaces described below or may include processing functionality built-in to the processor 702.

The illustrated power components 712 include one or more batteries 752, which can be connected to a battery gauge 754. The batteries 752 may be rechargeable or disposable. Rechargeable battery types include, but are not limited to, lithium polymer, lithium ion, nickel cadmium, and nickel metal hydride. Each of the batteries 752 may be made of one or more cells.

The power components 712 may also include a power connector, which may be combined with one or more of the aforementioned I/O components 710. The power components 712 may interface with an external power system or charging equipment via an I/O component.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following clauses:

Clause 1. A computer-implemented method for session centric access control of a remote connection, the method comprising: receiving a remote connection request from a client; redirecting the remote connection request to a trusted authority; receiving a redirection of the remote connection request along with one of a profile or a role determined for the client; creating a container for a remote connection; storing a certificate and a public key for the remote connection in the container; storing in the container an identifier for each endpoint authorized in association with the profile or the role determined for the client; creating single use credentials; initiating a secure shell for the remote connection using the single use credentials, the certificate and the public key; presenting the secure shell to the client; and expiring the single use credentials.

Clause 2. The method of Clause 1, the method including: receiving an access request for an endpoint from the client via the secure shell; determining whether an identifier corresponding to the requested endpoint is stored in the container; and if the identifier corresponding to the requested endpoint is stored in the container for the remote connection, allowing access to the requested endpoint.

Clause 3. The method of Clause 2, wherein: the identifier for each endpoint authorized in association with the profile or the role determined for the client comprises a private key corresponding to the endpoint.

Clause 4. The method of Clause 2, the method including: defining a set of profiles or a set of roles; and for each of the set of profiles or the set of roles, determining one or more endpoints authorized for the profile or the role.

Clause 5. The method of Clause 4, where: the method includes defining a set of task types; the step of, for each of the set of profiles or the set of roles, determining one or more endpoints authorized for the profile or the role comprises, for each of the set of profiles or the set of roles, determining one or more endpoints authorized for the profile or the role and one or more of the set of task types; and the step of storing in the container an identifier for each endpoint authorized in association with the profile or the role determined for the client comprises storing in the container an identifier for each endpoint authorized in association with the profile and the role determined for the client and the one or more of the set of task types.

Clause 6. The method of Clause 1, the method including: the single use credentials include an unmapped pseudo user identifier; and the step of expiring the single use credentials comprises expiring the pseudo user identifier.

Clause 7. The method of Clause 1, wherein the container comprises a rootless container.

Clause 8. A system for session centric access control of a remote connection, the system comprising: one or more processors; and one or more memory devices in communication with the one or more processors, the memory devices having computer-readable instructions stored thereupon that, when executed by the processors, cause the processors to execute a method for session centric access control of a remote connection, the method comprising: receiving a remote connection request from a client; redirecting the remote connection request to a trusted authority; receiving a redirection of the remote connection request along with one of a profile or a role determined for the client; creating a container for a remote connection; storing a certificate and a public key for the remote connection in the container; storing in the container an identifier for each endpoint authorized in association with the profile or the role determined for the client; creating single use credentials; initiating a secure shell for the remote connection using the single use credentials, the certificate and the public key; presenting the secure shell to the client; and expiring the single use credentials.

Clause 9. The system of Clause 8, where the method includes: receiving an access request for an endpoint from the client via the secure shell; determining whether an identifier corresponding to the requested endpoint is stored in the container; and if the identifier corresponding to the requested endpoint is stored in the container for the remote connection, allowing access to the requested endpoint.

Clause 10. The system of Clause 9, wherein: the identifier for each endpoint authorized in association with the profile or the role determined for the client comprises a private key corresponding to the endpoint.

Clause 11. The system of Clause 9, the method including: defining a set of profiles or a set of roles; and for each of the set of profiles or the set of roles, determining one or more endpoints authorized for the profile or the role.

Clause 12. The system of Clause 11, where: the method includes defining a set of task types; the step of, for each of the set of profiles or the set of roles, determining one or more endpoints authorized for the profile or the role comprises, for each of the set of profiles or the set of roles, determining one or more endpoints authorized for the profile or the role and one or more of the set of task types; and the step of storing in the container an identifier for each endpoint authorized in association with the profile or the role determined for the client comprises storing in the container an identifier for each endpoint authorized in association with the profile and the role determined for the client and the one or more of the set of task types.

Clause 13. The system of Clause 8, the method including: the single use credentials include an unmapped pseudo user identifier; and the step of expiring the single use credentials comprises expiring the pseudo user identifier.

Clause 14. The system of Clause 8, wherein the container comprises a rootless container.

Clause 15. One or more computer storage media having computer executable instructions stored thereon which, when executed by one or more processors, cause the processors to execute a method for session centric access control of a remote connection, the method comprising: receiving a remote connection request from a client; redirecting the remote connection request to a trusted authority; receiving a redirection of the remote connection request along with one of a profile or a role determined for the client; creating a container for a remote connection; storing a certificate and a public key for the remote connection in the container; storing in the container an identifier for each endpoint authorized in association with the profile or the role determined for the client; creating single use credentials; initiating a secure shell for the remote connection using the single use credentials, the certificate and the public key; presenting the secure shell to the client; and expiring the single use credentials.

Clause 16. The computer storage media of Clause 15, where the method includes: receiving an access request for an endpoint from the client via the secure shell; determining whether an identifier corresponding to the requested endpoint is stored in the container; and if the identifier corresponding to the requested endpoint is stored in the container for the remote connection, allowing access to the requested endpoint.

Clause 17. The computer storage media of Clause 16, wherein: the identifier for each endpoint authorized in association with the profile or the role determined for the client comprises a private key corresponding to the endpoint.

Clause 18. The computer storage media of Clause 16, the method including: defining a set of profiles or a set of roles; and for each of the set of profiles or the set of roles, determining one or more endpoints authorized for the profile or the role.

Clause 19. The computer storage media of Clause 18, where: the method includes defining a set of task types; the step of, for each of the set of profiles or the set of roles, determining one or more endpoints authorized for the profile or the role comprises, for each of the set of profiles or the set of roles, determining one or more endpoints authorized for the profile or the role and one or more of the set of task types; and the step of storing in the container an identifier for each endpoint authorized in association with the profile or the role determined for the client comprises storing in the container an identifier for each endpoint authorized in association with the profile and the role determined for the client and the one or more of the set of task types.

Clause 20. The computer storage media of Clause 15, the method including: the single use credentials include an unmapped pseudo user identifier; and the step of expiring the single use credentials comprises expiring the pseudo user identifier.

What is claimed is:

1. A computer-implemented method for session centric access control of a remote connection, the method comprising:
   receiving a remote connection request from a client;
   redirecting the remote connection request to a trusted authority;
   receiving a redirection of the remote connection request along with one of a profile or a role determined for the client;
   creating a container for a remote connection;
   storing a certificate and a public key for the remote connection in the container;
   storing in the container an identifier for each endpoint authorized in association with the profile or the role determined for the client;
   creating single use credentials;
   initiating a secure shell for the remote connection using the single use credentials, the certificate and the public key;
   presenting the secure shell to the client; and
   expiring the single use credentials.

2. The method of claim 1, the method including:
   receiving an access request for an endpoint from the client via the secure shell;
   determining whether an identifier corresponding to the requested endpoint is stored in the container; and
   if the identifier corresponding to the requested endpoint is stored in the container for the remote connection, allowing access to the requested endpoint.

3. The method of claim 2, wherein:
   the identifier for each endpoint authorized in association with the profile or the role determined for the client comprises a private key corresponding to the endpoint.

4. The method of claim 2, the method including:
   defining a set of profiles or a set of roles; and
   for each of the set of profiles or the set of roles, determining one or more endpoints authorized for the profile or the role.

5. The method of claim 4, where:
   the method includes defining a set of task types;
   the step of, for each of the set of profiles or the set of roles, determining one or more endpoints authorized for the profile or the role comprises, for each of the set of profiles or the set of roles, determining one or more endpoints authorized for the profile or the role and one or more of the set of task types; and
   the step of storing in the container an identifier for each endpoint authorized in association with the profile or the role determined for the client comprises storing in the container an identifier for each endpoint authorized in association with the profile and the role determined for the client and the one or more of the set of task types.

6. The method of claim 1, the method including:
   the single use credentials include an unmapped pseudo user identifier; and
   the step of expiring the single use credentials comprises expiring the pseudo user identifier.

7. The method of claim 1, wherein the container comprises a rootless container.

8. A system for session centric access control of a remote connection, the system comprising:
   one or more processors; and
   one or more memory devices in communication with the one or more processors, the memory devices having computer-readable instructions stored thereupon that, when executed by the processors, cause the processors to execute a method for session centric access control of a remote connection, the method comprising:
   receiving a remote connection request from a client;
   redirecting the remote connection request to a trusted authority;
   receiving a redirection of the remote connection request along with one of a profile or a role determined for the client;
   creating a container for a remote connection;
   storing a certificate and a public key for the remote connection in the container;

storing in the container an identifier for each endpoint authorized in association with the profile or the role determined for the client;

creating single use credentials;

initiating a secure shell for the remote connection using the single use credentials, the certificate and the public key;

presenting the secure shell to the client; and expiring the single use credentials.

9. The system of claim 8, where the method includes:

receiving an access request for an endpoint from the client via the secure shell;

determining whether an identifier corresponding to the requested endpoint is stored in the container; and if the identifier corresponding to the requested endpoint is stored in the container for the remote connection, allowing access to the requested endpoint.

10. The system of claim 9, wherein:

the identifier for each endpoint authorized in association with the profile or the role determined for the client comprises a private key corresponding to the endpoint.

11. The system of claim 9, the method including:

defining a set of profiles or a set of roles; and for each of the set of profiles or the set of roles, determining one or more endpoints authorized for the profile or the role.

12. The system of claim 11, where:

the method includes defining a set of task types;

the step of, for each of the set of profiles or the set of roles, determining one or more endpoints authorized for the profile or the role comprises, for each of the set of profiles or the set of roles, determining one or more endpoints authorized for the profile or the role and one or more of the set of task types; and the step of storing in the container an identifier for each endpoint authorized in association with the profile or the role determined for the client comprises storing in the container an identifier for each endpoint authorized in association with the profile and the role determined for the client and the one or more of the set of task types.

13. The system of claim 8, the method including:

the single use credentials include an unmapped pseudo user identifier; and the step of expiring the single use credentials comprises expiring the pseudo user identifier.

14. The system of claim 8, wherein the container comprises a rootless container.

15. One or more computer storage media having computer executable instructions stored thereon which, when executed by one or more processors, cause the processors to execute a method for session centric access control of a remote connection, the method comprising:

receiving a remote connection request from a client;

redirecting the remote connection request to a trusted authority;

receiving a redirection of the remote connection request along with one of a profile or a role determined for the client;

creating a container for a remote connection;

storing a certificate and a public key for the remote connection in the container;

storing in the container an identifier for each endpoint authorized in association with the profile or the role determined for the client;

creating single use credentials;

initiating a secure shell for the remote connection using the single use credentials, the certificate and the public key;

presenting the secure shell to the client; and expiring the single use credentials.

16. The computer storage media of claim 15, where the method receiving an access request for an endpoint from the client via the secure shell;

determining whether an identifier corresponding to the requested endpoint is stored in the container; and if the identifier corresponding to the requested endpoint is stored in the container for the remote connection, allowing access to the requested endpoint.

17. The computer storage media of claim 16, wherein:

the identifier for each endpoint authorized in association with the profile or the role determined for the client comprises a private key corresponding to the endpoint.

18. The computer storage media of claim 16, the method including:

defining a set of profiles or a set of roles; and for each of the set of profiles or the set of roles, determining one or more endpoints authorized for the profile or the role.

19. The computer storage media of claim 18, where:

the method includes defining a set of task types;

the step of, for each of the set of profiles or the set of roles, determining one or more endpoints authorized for the profile or the role comprises, for each of the set of profiles or the set of roles, determining one or more endpoints authorized for the profile or the role and one or more of the set of task types; and the step of storing in the container an identifier for each endpoint authorized in association with the profile or the role determined for the client comprises storing in the container an identifier for each endpoint authorized in association with the profile and the role determined for the client and the one or more of the set of task types.

20. The computer storage media of claim 15, the method including:

the single use credentials include an unmapped pseudo user identifier; and the step of expiring the single use credentials comprises expiring the pseudo user identifier.

\* \* \* \* \*